United States Patent
Doo et al.

(10) Patent No.: US 11,212,600 B2
(45) Date of Patent: Dec. 28, 2021

(54) INTEGRATED DYNAMIC BANDWIDTH ALLOCATION METHOD AND APPARATUS IN PASSIVE OPTICAL NETWORKS

(71) Applicant: Electronics and Telecommunications Research Institute, Daejeon (KR)

(72) Inventors: Kyeong Hwan Doo, Daejeon (KR); Kwang Ok Kim, Jeonju-si (KR); Jung-yeol Oh, Sejong-si (KR); Han Hyub Lee, Daejeon (KR); Hwan Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/952,794

(22) Filed: Nov. 19, 2020

(65) Prior Publication Data

US 2021/0160597 A1 May 27, 2021

(30) Foreign Application Priority Data

Nov. 27, 2019 (KR) ........................ 10-2019-0154050

(51) Int. Cl.
*H04Q 11/00* (2006.01)
*H04J 14/02* (2006.01)
*H04J 14/08* (2006.01)

(52) U.S. Cl.
CPC ...... *H04Q 11/0067* (2013.01); *H04J 14/0245* (2013.01); *H04J 14/08* (2013.01);
(Continued)

(58) Field of Classification Search
CPC ........ H04Q 11/0066–0067; H04Q 2011/0064; H04Q 2011/0086; H04J 14/0249–0252
See application file for complete search history.

(56) References Cited

U.S. PATENT DOCUMENTS 8,639,117 B2  1/2014  Yoo et al.
10,420,085 B2  9/2019  Andreoli-Fang
(Continued)

FOREIGN PATENT DOCUMENTS

JP  2011-146780  7/2011
JP  2018-82406  5/2018

OTHER PUBLICATIONS

Hiroko Nomura et al., "First demonstration of optical-mobile cooperation interface for Mobile fronthaul with TDM-PON", IEICE Communications Express, 2017, vol. 1, 1-6.

*Primary Examiner* — Nathan M Cors
(74) *Attorney, Agent, or Firm* — Kile Park Reed & Houtteman PLLC

(57) ABSTRACT

An integrated dynamic bandwidth allocation method and apparatus in a passive optical network (PON) are provided. The bandwidth allocation method performed by an optical line terminal (OLT) includes generating a service level agreement (SLA) table including an SLA required for calculation for bandwidth allocation corresponding to at least one service queue included in at least one optical network unit (ONU) connected to the OLT, calculating maximum allocatable bandwidths for respective predetermined cycles based on the generated SLA table, and, when a service queue requiring bandwidth allocation is present in the ONU, performing bandwidth allocation according to different bandwidth allocation methods based on a priority level of the service queue using the calculated maximum allocatable bandwidths.

10 Claims, 6 Drawing Sheets

(52) U.S. Cl.
CPC . *H04Q 11/0066* (2013.01); *H04Q 2011/0064* (2013.01); *H04Q 2011/0086* (2013.01)

(56) References Cited

U.S. PATENT DOCUMENTS

| | | | | |
|---|---|---|---|---|
| 2007/0041384 A1* | 2/2007 | Das | ............... | H04Q 11/0067 370/395.4 |
| 2010/0008379 A1* | 1/2010 | Yoo | ............... | H04J 3/1694 370/468 |
| 2012/0275784 A1* | 11/2012 | Soto | ............... | H04Q 11/0067 398/38 |
| 2017/0013618 A1 | 1/2017 | Shin | | |
| 2019/0199646 A1* | 6/2019 | Singh | ............... | H04L 47/522 |

* cited by examiner

INTEGRATED DYNAMIC BANDWIDTH ALLOCATION METHOD AND APPARATUS IN PASSIVE OPTICAL NETWORKS

CROSS-REFERENCE TO RELATED APPLICATION(S)

This application claims the benefit of Korean Patent Application No. 10-2019-0154050, filed on Nov. 27, 2019, in the Korean Intellectual Property Office, the disclosure of which is incorporated herein by reference.

BACKGROUND

1. Field of the Invention

Example embodiments relate to a passive optical network (PON), and more particularly, to a method for allocating a bandwidth to an optical network unit (ONU) in an optical subscriber network using a time division multiplex (TDM) scheme, and an optical line terminal (OLT) for performing the method.

2. Description of the Related Art

A passive optical network (PON) refers to a network between a subscriber and a central office, the network having a 1:N structure in which at least one optical network unit (ONU) is connected to a single optical line terminal (OLT). The PON has been built to provide high-speed Internet services to homes, apartments, buildings, and the like. However, the coverage range of the PON is gradually expanding to backhaul/fronthaul networks of a base station based on price competitiveness.

In order to accommodate 5G services including future high-capacity ultra-realistic services, the PON needs to meet not only speed but also low latency requirements. These services differ depending on the standard, but require a latency of 0.1 to 1 ms, including wired and wireless transmission sections.

Therefore, recently, a bandwidth allocation method that meets not only speed but also low latency requirements has been required to provide 5G services in the PON.

SUMMARY

Example embodiments relate to an integrated dynamic bandwidth allocation method in a passive optical network (PON). More specifically, when a service queue requiring bandwidth allocation is present in an optical network unit (ONU), aspects provide a method and apparatus for performing bandwidth allocation according to different bandwidth allocation methods based on a priority level of the service queue.

According to an aspect, there is provided a bandwidth allocation method performed by an optical line terminal (OLT), the bandwidth allocation method including generating a service level agreement (SLA) table including an SLA required for calculation for bandwidth allocation corresponding to at least one service queue included in at least one ONU connected to the OLT, calculating maximum allocatable bandwidths for respective predetermined cycles based on the generated SLA table, and, when a service queue requiring bandwidth allocation is present in the ONU, performing bandwidth allocation according to different bandwidth allocation methods based on a priority level of the service queue using the calculated maximum allocatable bandwidths.

The performing of the bandwidth allocation may include performing bandwidth allocation in an order of a service queue with a highest priority level.

The performing of the bandwidth allocation may include performing bandwidth allocation by applying a first bandwidth allocation scheme, which is a static bandwidth allocation (SBA) scheme, with respect to a first service queue with the highest priority level using the calculated maximum allocatable bandwidths, performing bandwidth allocation by applying a second bandwidth allocation scheme, which is a dynamic bandwidth allocation (DBA) scheme, with respect to a second service queue with a priority level lower than that of the first service queue using a bandwidth remaining after bandwidth allocation is performed according to the first bandwidth allocation scheme among the calculated maximum allocatable bandwidths, and performing bandwidth allocation by applying a third bandwidth allocation scheme, which is the DBA scheme, with respect to a third service queue with a priority level lower than that of the second service queue using a bandwidth remaining after bandwidth allocation is performed according to the first bandwidth allocation scheme and the second bandwidth allocation scheme among the calculated maximum allocatable bandwidths.

The bandwidth allocation method may further include receiving wireless section scheduling information on a user terminal of a radio unit (RU) connected to an ONU from a centralized unit (CU) or a distributed unit (DU). The performing of the bandwidth allocation according to the second bandwidth allocation scheme may include generating a virtual report message based on the wireless section scheduling information, and performing bandwidth allocation by applying the second bandwidth allocation scheme with respect to the second service queue based on the generated virtual report message.

The virtual report message may be generated based on a time when a data packet arrives at the ONU from the RU.

The SLA table may include at least one of a service identifier, a minimum bandwidth, a maximum bandwidth, and a service period corresponding to a service queue included in the ONU.

The SLA table may be generated, based on a priority level determined according to a latency requirement of a service provided through the service queue and whether the service is guaranteed, for each service queue belonging to a same priority level.

According to another aspect, there is provided an OLT including a processor. The processor may be configured to generate an SLA table including an SLA required for calculation for bandwidth allocation corresponding to at least one service queue included in at least one ONU connected to the OLT, calculate maximum allocatable bandwidths for respective predetermined cycles based on the generated SLA table, and, when a service queue requiring bandwidth allocation is present in the ONU, perform bandwidth allocation according to different bandwidth allocation methods based on a priority level of the service queue using the calculated maximum allocatable bandwidths.

The processor may be configured to perform bandwidth allocation in an order of a service queue with a highest priority level.

The processor may be configured to perform bandwidth allocation by applying a first bandwidth allocation scheme, which is an SBA scheme, with respect to a first service queue with the highest priority level using the calculated maximum allocatable bandwidths, perform bandwidth allocation by applying a second bandwidth allocation scheme, which is a DBA scheme, with respect to a second service queue with a priority level lower than that of the first service queue using a bandwidth remaining after bandwidth allocation is performed according to the first bandwidth allocation scheme among the calculated maximum allocatable bandwidths, and perform bandwidth allocation by applying a third bandwidth allocation scheme, which is the DBA scheme, with respect to a third service queue with a priority level lower than that of the second service queue using a bandwidth remaining after bandwidth allocation is performed according to the first bandwidth allocation scheme and the second bandwidth allocation scheme among the calculated maximum allocatable bandwidths.

The processor may be configured to receive wireless section scheduling information on a user terminal of an RU connected to an ONU from a CU or a DU, generate a virtual report message based on the wireless section scheduling information, and perform bandwidth allocation by applying the second bandwidth allocation scheme with respect to the second service queue based on the generated virtual report message.

The virtual report message may be generated based on a time when a data packet arrives at the ONU from the RU.

The SLA table may include at least one of a service identifier, a minimum bandwidth, a maximum bandwidth, and a service period corresponding to a service queue included in the ONU.

The SLA table may be generated, based on a priority level determined according to a latency requirement of a service provided through the service queue and whether the service is guaranteed, for each service queue belonging to a same priority level.

Additional aspects of example embodiments will be set forth in part in the description which follows and, in part, will be apparent from the description, or may be learned by practice of the disclosure.

Example embodiments relate to an integrated dynamic bandwidth allocation method in a PON. More specifically, when a service queue requiring bandwidth allocation is present in an ONU, an OLT may perform bandwidth allocation according to different bandwidth allocation methods based on a priority level of the corresponding service queue, thereby increasing a network utilization rate, and guaranteeing a latency requirement.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
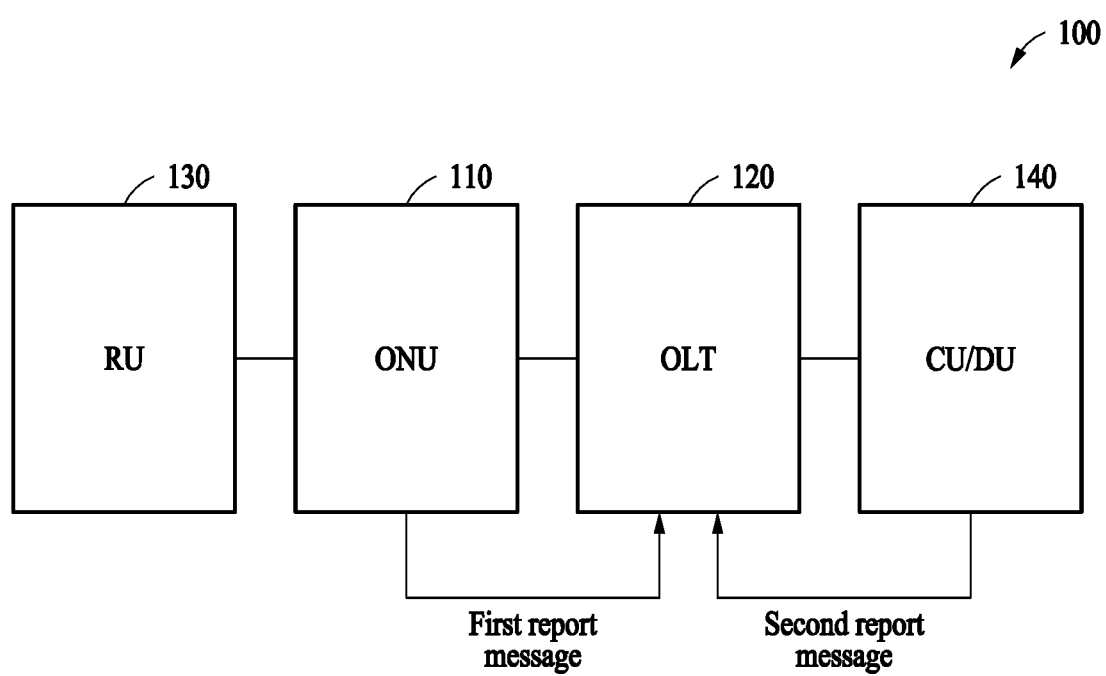
FIG. 1 is a diagram illustrating an integrated bandwidth allocation system according to an example embodiment.

FIG. 1 is a diagram illustrating an integrated bandwidth allocation system according to an example embodiment.

Referring to FIG. 1, an integrated bandwidth allocation system 100 according to example embodiments may include an optical network unit (ONU) 110, an optical line terminal (OLT) 120, a radio unit (RU) 130, and a centralized unit (CU)/distributed unit (DU) 140. A scheme of allocating a bandwidth to the ONU 110 may include a static bandwidth allocation (SBA) scheme in which the OLT 120 allocates a certain amount of bandwidth regardless of an amount of traffic of the ONU 110, and a dynamic bandwidth allocation (DBA) scheme in which the OLT 120 changes an amount of bandwidth to be allocated according to the amount of traffic. In other words, the SBA scheme may use a non-status reporting (NSR) scheme of allocating a predetermined fixed bandwidth without monitoring a queuing amount of the ONU 110. Conversely, the DBA scheme may use a status reporting (SR)-DBA scheme in which the ONU 110 reports the queuing amount to the OLT 120 in real time, and the OLT 120 allocates a dynamic bandwidth according to an amount of report received from the ONU 110.

The SBA scheme may easily meet a latency requirement. However, since a predetermined fixed bandwidth needs be allocated to the ONU 110 even when unnecessary, a network utilization rate may be low. Conversely, it may be difficult for the SR-DBA scheme to meet the latency requirement. However, since the dynamic bandwidth is allocated to the ONU 110 only when necessary, the network utilization rate may be very high. In a conventional passive optical network (PON), the latency requirement is not high, and accordingly the PON has been generally operated in the SR-DBA scheme.

In the PON, latency may refer to a time period required until a packet is outputted from the OLT 120 to a core network from a time point when the packet is inputted to the ONU 110 from a user terminal of a subscriber connected to the RU 130. In the PON, data transmission in a downstream direction, that is, data transmission from the OLT 120 to the ONU 110, may use a broadcasting scheme, and accordingly the latency may not be high. However, data transmission in an upstream direction, that is, data transmission from the ONU 110 to the OLT 120 may use a time division multiplex (TDM) scheme, and accordingly the latency may be increased depending on the number of ONUs and an amount of traffic. Therefore, the latency may be lowered by limiting the number of ONUs and the amount of traffic. However, since the network utilization rate is lowered, limiting the number of ONUs and the amount of traffic may be a factor of price increase.

A transmission section between the RU 130 and the CU/DU 140, which are a separate-type base station, may be referred to as a fronthaul, and a fronthaul section may have a large amount of data transmission, and particularly may require a latency of several hundred microseconds (μsec) or less. Therefore, when a service is provided in the SR-DBA scheme by applying the fronthaul to the PON, the low latency requirement may not be met, and accordingly it may be necessary to provide the service in the SBA scheme.

Figure 2:
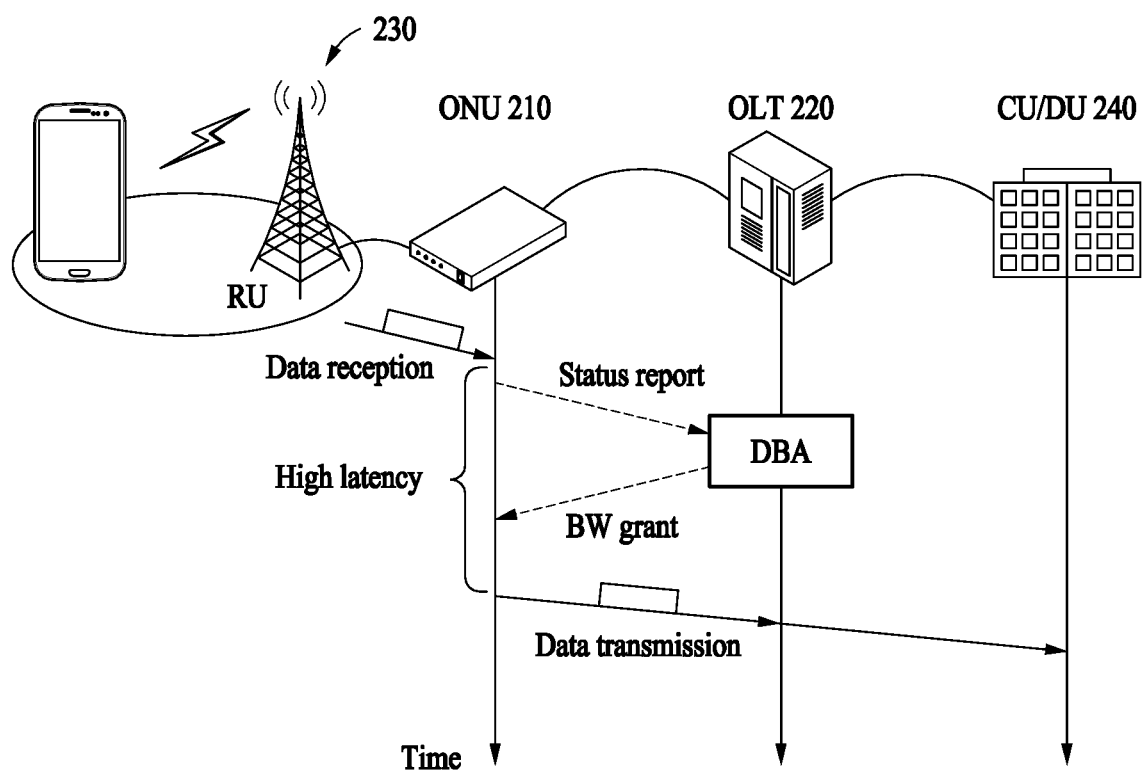
FIG. 2 is a diagram illustrating an example of a fronthaul using a status reporting dynamic bandwidth allocation (SR-DBA) scheme-based passive optical network (PON) according to an example embodiment.

Specifically, FIG. 2 is a diagram illustrating an example of a fronthaul using a SR-DBA scheme-based PON according to an example embodiment. Referring to FIG. 2, when data is received from an RU 230, an ONU 210 may store data in its own buffer and periodically report an amount of traffic waiting in the buffer to an OLT 220 (Status report). Then, the OLT 220 may allocate a dynamic bandwidth based on an amount of requested bandwidth included in a report message received from the ONU 210 (BW grant). Thereafter, the ONU 210 may transmit data stored in the buffer to the OLT 220 and a CU/DU 240 through the bandwidth allocated by the OLT 220. When a service is provided in the SR-DBA scheme as described above, the latency may not be low in that the ONU 210 requests bandwidth allocation to the OLT 220 and transmits data after receiving a granted bandwidth.

Referring back to FIG. 1, in order to apply the DBA scheme-based PON to the fronthaul, it may be necessary to lower latency in an upstream direction. To this end, a DBA scheme for sharing mobile scheduling information between the CU/DU 140 and the OLT 120 has been proposed. A scheme in which the OLT 120 allocates a bandwidth through cooperation with the CU/DU 140 without the status report of the ONU 110 may be referred to as a cooperative dynamic bandwidth allocation (Co-DBA) scheme.

Figure 3:
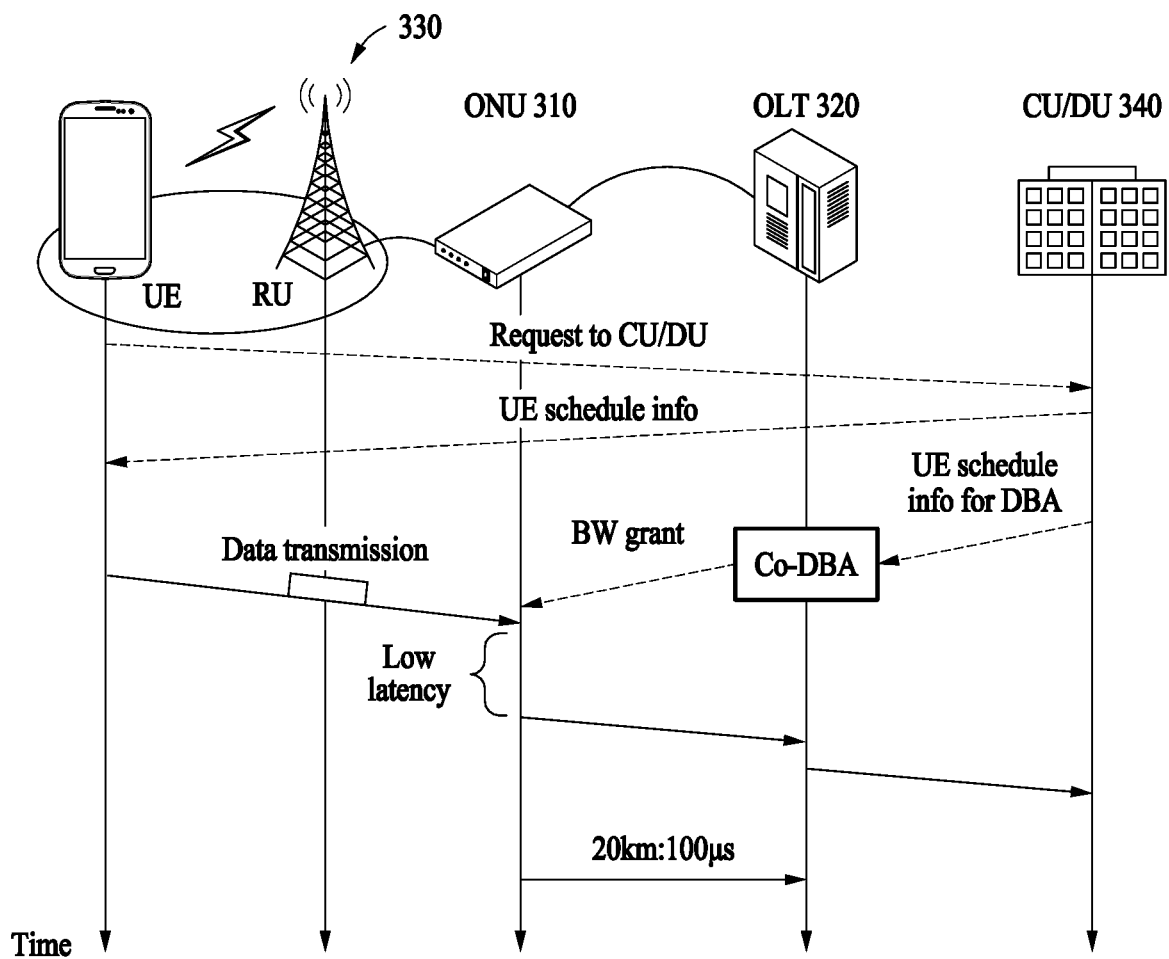
FIG. 3 is a diagram illustrating an example of a fronthaul using a cooperative dynamic bandwidth allocation (Co-DBA) scheme-based PON according to an example embodiment.

Specifically, FIG. 3 is a diagram illustrating an example of a fronthaul using a Co-DBA scheme-based PON according to an example embodiment. Referring to FIG. 3, a CU/DU 340 may manage wireless section transmission scheduling of a user equipment (UE) connected to an RU 330, and accordingly the CU/DU 340 may identify a time when the RU 330 transmits data to the CU/DU 340 and an amount of the data. When an OLT 320 has information described above, the OLT 320 may predict a time when data is inputted from the RU 330 to an ONU 310 and an amount of data.

Therefore, the OLT 320 may receive wireless section transmission scheduling information of the UE from the CU/DU 340 and calculate a bandwidth to be allocated in advance. Thus, the OLT 320 may grant a transmission permission (BW grant) to the ONU 310 without the status report from the ONU 310, thereby controlling data inputted to the ONU 310 to be transmitted to the OLT 320 without buffering to shorten the latency.

As described above, since the Co-DBA scheme needs to share wireless section transmission scheduling information between the CU/DU 340, which is a radio device, and the OLT 320, the Co-DBA scheme may not be compatible with an existing PON-based DBA scheme. Therefore, since it is be necessary to configure an independent network operated in the Co-DBA scheme, the Co-DBA scheme may not coexist with an ONU of an existing general wireline subscriber (Fiber To The Home, FTTH) or business subscriber (Fiber To The Building, FTTB). In order for an existing wireline subscriber and a base station to be accommodated in one network, a single bandwidth allocation function may be required. In order to divide a common time domain using the TDM scheme, it may be necessary to operate the SBA scheme, the Co-DBA scheme, and the SR-DBA scheme together, and accordingly an integrated bandwidth allocation system for simultaneously performing the above-described schemes may be required.

Figure 4:
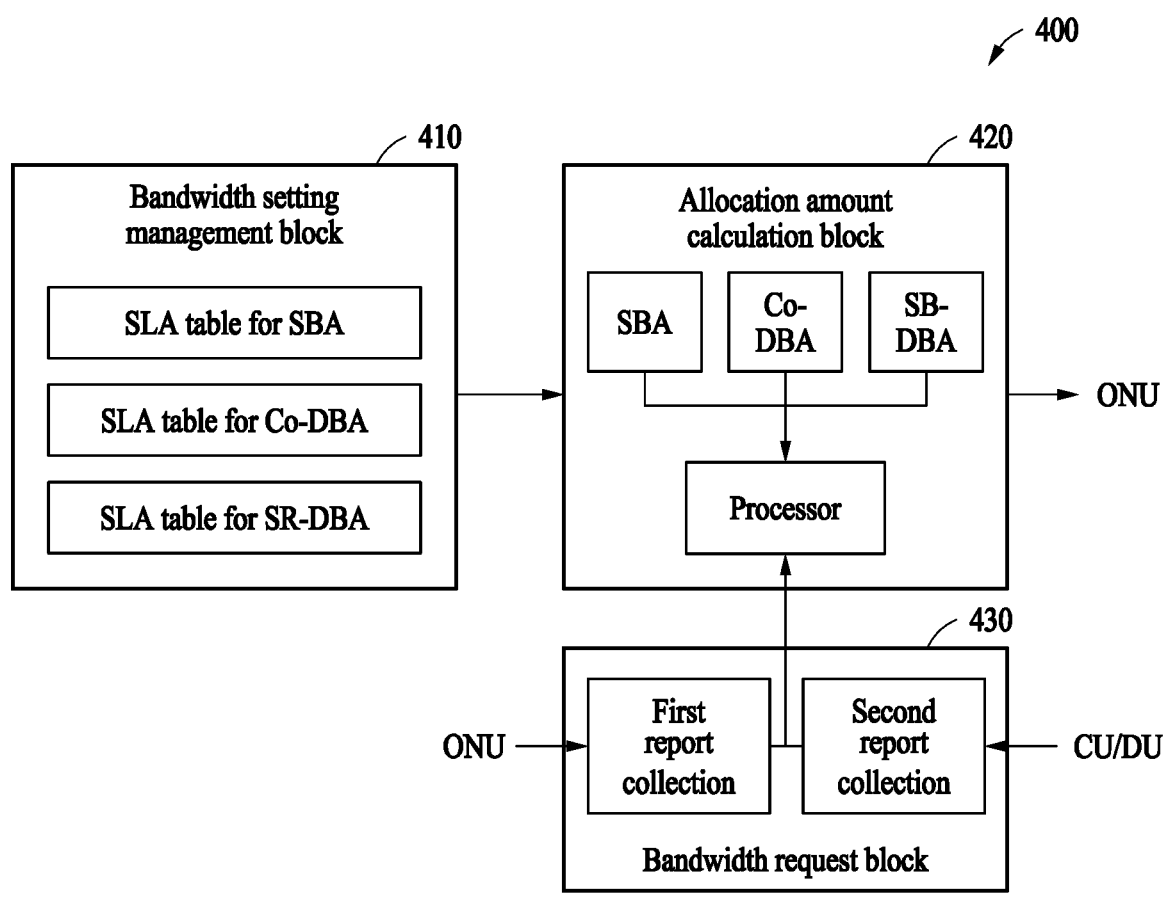
FIG. 4 is a block diagram illustrating a bandwidth allocation method performed by an optical line terminal (OLT) according to an example embodiment.

FIG. 4 is a block diagram illustrating a bandwidth allocation method performed by an OLT according to an example embodiment.

Referring to FIG. 4, an OLT 400 that performs an integrated dynamic bandwidth allocation method provided by example embodiments may perform bandwidth allocation on an ONU according to following detailed blocks through a processor. First, the OLT 400 may generate a service level agreement (SLA) table required for calculation for bandwidth allocation corresponding to at least one service queue included in at least one ONU connected to the OLT 400 through a bandwidth setting management block 410. Through the SLA table, the OLT 400 may set a service bandwidth provided for each service queue of each ONU, a quality of service (QoS) parameter, and the like. To this end, the SLA table may include at least one service agreement content of a service identifier, a minimum bandwidth, a maximum bandwidth, and a service period corresponding to a service queue included in the ONU.

The ONU may have at least one service queue for classifying services. When the number of ONUs that can be connected to the PON, that is, the number of ONUs that can be connected to the OLT 400, is n, and there are m service queues per ONU, the SLA table may include a table having n×m addresses.

Here, the OLT 400 may generate an SLA table, based on a priority level determined according to a latency requirement of a service provided through a service queue of an ONU and whether the service is guaranteed, for each service queue belonging to a same priority level. For example, when the service provided through the service queue of the ONU meets low latency, and it is necessary to guarantee the service, the OLT 400 may set a first priority level with respect to the service queue, and may determine that bandwidth allocation is performed according to the SBA scheme. Then, the OLT 400 may sequentially fill a service agreement content for the service queue set to the first priority level from a lowest address of memory. Here, an area including service agreement contents of service queues on which bandwidth allocation is performed according to the SBA scheme may be defined as an SLA table for SBA.

Next, with respect to a service queue having a priority level lower than those of the service queues on which bandwidth allocation is performed according to the SBA scheme although the service provided through the service queue of the ONU needs to meet the low latency and it is necessary to guarantee the service, the OLT 400 may set a second priority level, and may determine that bandwidth allocation is performed according to the Co-DBA scheme. Then, the OLT 400 may sequentially fill a service agreement content for the service queue set to the second priority level subsequent to an address where the SLA table for SBA is present. Here, an area including service agreement contents of service queues on which bandwidth allocation is performed according to the Co-DBA scheme may be defined as an SLA table for Co-DBA.

Finally, with respect to service queues other than the service queues on which bandwidth allocation is performed according to the SBA scheme and the Co-DBA scheme among service queues of the ONU, the OLT 400 may set a third priority level, and may determine that bandwidth allocation is performed according to the SR-DBA scheme. Then, the OLT 400 may sequentially fill service agreement contents for the service queues set to the third priority level subsequent to an address where the SLA table for Co-DBA is present. Here, an area including a service agreement content for the service queue on which bandwidth allocation is performed according to the SR-DBA scheme may be defined as an SLA table for SR-DBA. Services provided through the service queues corresponding to the third priority level may be classified into a guaranteed service and a non-guaranteed service, and the non-guaranteed service may not guarantee the service.

In summary, the OLT 400 may designate an SLA table area for SBA, an SLA table area for Co-DBA, and an SLA table area for SR-DBA from a low address of the memory according to the priority level of the service queue of the ONU. When there are L SLA tables for SBA, M SLA tables for Co-DBA, and N SLA tables for SR-DBA, it may be necessary to meet (L+M+N)≤SLA table size (n×m).

The OLT 400 may calculate maximum allocatable bandwidths for respective cycles through a minimum bandwidth, a maximum bandwidth, and a service period included in the SLA table set in the bandwidth setting management block 410. That is, bandwidth allocation may be performed based on a predetermined cycle.

In addition, the OLT 400 may calculate a time period and an amount of bandwidth to be allocated for each service according to a bandwidth request quantity of each ONU using the maximum allocatable bandwidth for the respective cycles calculated in an allocation amount calculation block 420. Here, the OLT 400 may sequentially perform bandwidth allocation starting from a service queue of the ONU having a highest priority using a request matrix received through a bandwidth request block 430.

That is, the OLT 400 may allocate a fixed bandwidth according to the SBA scheme with respect to a service queue corresponding to a first priority level included in the request matrix using the maximum allocatable bandwidths. Here, the OLT 400 may preferentially allocate the fixed bandwidth according to a fixed bandwidth and a service period set for the SLA table for SBA, and the allocated fixed bandwidth may be set so as not to exceed one cycle.

Thereafter, the OLT 400 may allocate a dynamic bandwidth according to the Co-DBA scheme with respect to a service queue corresponding to a second priority level using a bandwidth remaining after bandwidth allocation is performed according to the SBA scheme among the maximum allocatable bandwidths. The bandwidth request block 430 may collect a first report message directly received from the ONU or may generate a virtual second report. Here, the first report message received from the ONU may be used when calculating SR-DBA, and the virtual second report message may be used when calculating Co-DBA. The virtual second report may be generated at a time point when a Co-DBA operation is required by predicting an amount of data to be transmitted by an RU to the ONU through wireless section scheduling information received from a CU/DU, and a time when the data is to be transmitted from the RU to the ONU. As described above, the OLT 400 may generate a request matrix using the first report message and the second report message through the bandwidth request block 430, and bandwidth allocation for a service queue of the ONU may be performed using the request matrix generated at the beginning of each cycle.

It may be highly important to generate a virtual second report message in order to allow the ONU on which bandwidth allocation is performed using the Co-DBA scheme to provide a low latency service. The OLT 400 may calculate an amount of the data arriving at the ONU from the RU and a data arrival time using the bandwidth request block 430 through the wireless section scheduling information received from the CU/DU. On this basis, the OLT 400 may generate a virtual second report message having a format similar with that of the first report message directly received from the ONU. Thereafter, the OLT 400 may perform bandwidth allocation on the ONU through the virtual second report message in the allocation amount calculation block 420.

Figure 5:
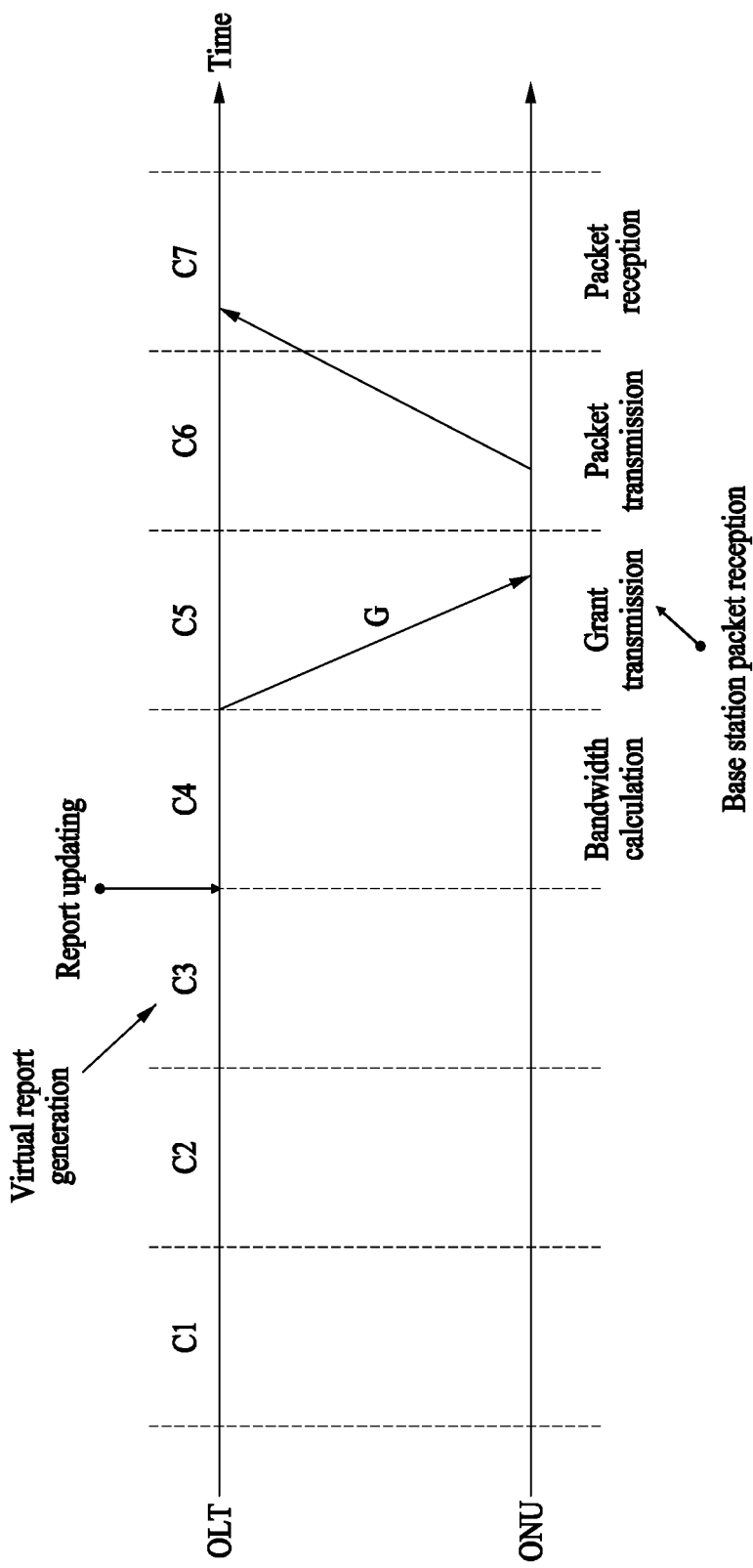
FIG. 5 is a diagram illustrating a packet reception time point and a virtual second report generation time point of a base station based on Co-DBA scheme-based bandwidth allocation according to an example embodiment.

Since the Co-DBA scheme calculates a bandwidth to be allocated in the same manner as the SR-DBA scheme, it may be important to generate a virtual second report according to a packet reception time point of a base station. FIG. 5 a packet reception time point and a virtual second report generation time point of a base station based on Co-DBA scheme-based bandwidth allocation. Referring to FIG. 5, as an example, one cycle may be required when a cycle period is 125 µs, a maximum distance between the OLT 400 and the ONU is 20 km, and a unidirectional optical transmission time is about 100 µs. Specifically, FIG. 5 is a diagram illustrating a process until a packet arriving at the ONU using the Co-DBA scheme is received by the OLT 400 when each cycle is represented by Cx (x=1, 2, . . . ).

As illustrated in FIG. 5, when it is desired that a packet of the base station arrives at cycle C5 and is received by the OLT 400 in cycle C7, the OLT 400 may generate a virtual second report message in cycle C3 since the Co-DBA scheme is operated in the same cycle as that of the SR-DBA scheme. In this case, the OLT 400 may perform bandwidth calculation for bandwidth allocation in cycle C4 and transmit a grant message to the ONU in cycle C5. In addition, when the ONU transmits the packet to the OLT 400 at cycle C6 based on the received grant message, the transmitted packet may arrive at cycle C7.

Figure 6:
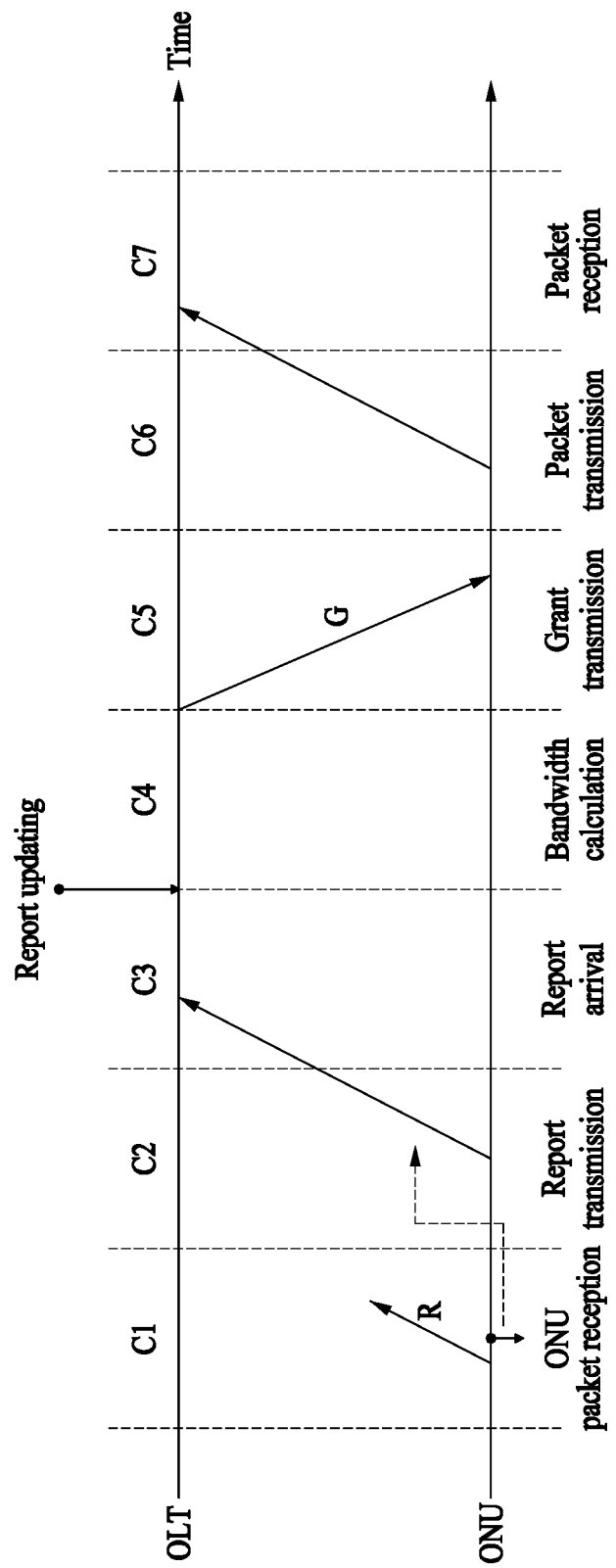
FIG. 6 is a diagram illustrating a process until a packet arriving at an optical network unit (ONU) using an SR-DBA scheme is received by an OLT according to an example embodiment.

Finally, the OLT 400 may allocate a dynamic bandwidth according to the SR-DBA scheme with respect to a service queue corresponding to a third priority level using a bandwidth remaining after bandwidth allocation is performed according to the SBA scheme and the Co-DBA scheme among the maximum allocatable bandwidths. Specifically, FIG. 6 is a diagram illustrating a process until a packet arriving at the ONU using the SR-DBA scheme is received by the OLT 400 when each cycle is represented by Cx (x=1, 2, . . . ). First, when the packet arrives at the ONU (C1), the ONU may transmit a report message on an amount of traffic waiting in its buffer to the OLT 400 (C2). When the report message arrives at the OLT 400 (C3), the OLT 400 may calculate a bandwidth allocation amount for the ONU based on the received report message (C4). Thereafter, the OLT 400 may transmit a grant message to the ONU (C5), and the ONU receiving the grant message may transmit the packet to the OLT 400 through a bandwidth identified through the grant message (C6). At least six to seven cycles may be required for the process until the packet arriving at the ONU is received by the OLT 400 (C7). Since all processes are performed in the form of a pipeline, seven processes may be performed simultaneously per cycle.

Here, the OLT 400 may perform bandwidth allocation according to the SR-DBA scheme based on a report message collected in a previous cycle at a time point of report updating at the beginning of each cycle. A report message arriving at cycle C3 in FIG. 6 may be used for a bandwidth allocation operation of cycle C4, and a result of the bandwidth allocation operation may be scheduling information of cycle C7. That is, the packet of the ONU may arrive at cycle C7 through the report message arriving at cycle C3. When the packet received by the ONU is received from a service queue having a low priority, that is, a service queue having a third priority level, the packet may not be serviced in cycle C7, and may be delayed to a next cycle.

That is, when the Co-DBA scheme and the SR-DBA scheme are compared to each other, in order for the packet to arrive at cycle C7, the packet may need to arrive at the ONU in cycle C1 in the SR-DBA scheme. However, in the Co-DBA scheme, transmission may be possible even when the packet arrives at cycle C5, thereby shortening a latency of about 4 cycles.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, that is, a computer program tangibly embodied in an information carrier, for example, in a machine-readable storage device (for example, a computer-readable medium) or in a propagated signal for processing by, or to control an operation of a data processing apparatus, for example, a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. In general, a processor will receive instructions and data from a read-only memory or a random-access memory or both. Elements of a computer may include at least one processor to execute instructions and one or more memory devices to store instructions and data. In general, a computer will also include or be coupled to receive data from, transfer data to, or perform both on one or more mass storage devices to store data, for example, magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), and the like, and magneto-optical media such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

In addition, non-transitory computer-readable media may be any available media that may be accessed by a computer and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described example embodiments in all example embodiments, and it should be understood that the above-described program components and apparatuses may be incorporated into a single software product or may be packaged in multiple software products.

It should be understood that example embodiments disclosed herein are merely illustrative and are not intended to limit the scope of the disclosure. It will be apparent to those skilled in the art that various modifications of the example embodiments may be made without departing from the spirit and scope of the claims and their equivalents.

What is claimed is:

1. A bandwidth allocation method performed by an optical line terminal (OLT), the bandwidth allocation method comprising:

generating a service level agreement (SLA) table comprising an SLA required for calculation for bandwidth allocation corresponding to at least one service queue included in at least one optical network unit (ONU) connected to the OLT;

calculating maximum allocatable bandwidths for respective predetermined cycles based on the generated SLA table;

when service queues requiring bandwidth allocation are present in the ONU, performing bandwidth allocation by applying Static Bandwidth Allocation (SBA) scheme, with respect to a first service queue with a highest priority level using the calculated maximum allocatable bandwidths;

performing bandwidth allocation by applying Dynamic Bandwidth Allocation (Co-DBA) scheme, with respect to a second service queue with a priority level lower than that of the first service queue using a bandwidth remaining after bandwidth allocation is performed according to the SBA scheme among the calculated maximum bandwidths; and preforming bandwidth allocation by applying Status Reporting Dynamic Bandwidth Allocation (SR-DBA) scheme, with respect to a third service queue with a priority level lower than that of the second queue using a bandwidth remaining after bandwidth allocation is performed according to the SBA scheme and the Co-DBA scheme among the calculated maximum allocatable bandwidths;

wherein the performing of the bandwidth allocation by applying the Co-DBA scheme is performed using wireless section scheduling information on a user terminal of a radio unit (RU) connected to an ONU received from a centralized unit (CU) or a distributed unit (DU).

2. The bandwidth allocation method of claim 1, wherein the performing of the bandwidth allocation according to the Co-DBA scheme comprises:

generating a virtual report message based on the wireless section scheduling information; and performing bandwidth allocation by applying the Co-DBA scheme with respect to the second service queue based on the generated virtual report message.

3. The bandwidth allocation method of claim 2, wherein the virtual report message is generated based on a time when a data packet arrives at the ONU from the RU.

4. The bandwidth allocation method of claim 1, wherein the SLA table comprises at least one of a service identifier, a minimum bandwidth, a maximum bandwidth, and a service period corresponding to a service queue included in the ONU.

5. The bandwidth allocation method of claim 1, wherein the SLA table is generated, based on a priority level determined according to a latency requirement of a service provided through the service queue and whether the service is guaranteed, for each service queue belonging to a same priority level.

6. An optical line terminal (OLT) comprising:

a processor, wherein the processor is configured to:

generate a service level agreement (SLA) table comprising an SLA required for calculation for bandwidth allocation corresponding to at least one service queue included in at least one optical network unit (ONU) connected to the OLT;

calculate maximum allocatable bandwidths for respective predetermined cycles based on the generated SLA table;

when service queue requiring bandwidth allocation are present in the ONU, perform bandwidth allocation by applying Static Bandwidth Allocation (SBA) scheme, with respect to a first service queue with a highest priority level using the calculated maximum allocatable bandwidths;

perform bandwidth allocation by applying Dynamic Bandwidth Allocation (Co-DBA) scheme, with respect to a second queue with a priority level lower than that of the first service queue using a bandwidth remaining after bandwidth allocation is performed according to the SBA scheme among the calculated maximum allocatable bandwidths; and perform bandwidth allocation by applying Status Reporting Dynamic Bandwidth Allocation (SR-DBA) scheme, with respect to a third service queue with a priority level lower than that of the second service bandwidth remaining after bandwidth allocation is performed according to the SBA scheme and the Co-DBA scheme among the calculated maximum allocatable bandwidths, wherein the processor performs the bandwidth allocation by applying the Co-DBA scheme using wireless section scheduling information on n user terminal of a radio unit (RU) connected to an ONU received from a centralized unit (CU) or a distributed unit (DU).

7. The OLT of claim 6, wherein the processor is configured to:

generate a virtual report message based on the wireless section scheduling information; and perform bandwidth allocation by applying the Co-DBA scheme with respect to the second service queue based on the generated virtual report message.

8. The OLT of claim 7, wherein the virtual report message is generated based on a time when a data packet arrives at the ONU from the RU.

9. The OLT of claim 6, wherein the SLA table comprises at least one of a service identifier, a minimum bandwidth, a maximum bandwidth, and a service period corresponding to a service queue included in the ONU.

10. The OLT of claim 6, wherein the SLA table is generated, based on a priority level determined according to a latency requirement of a service provided through the service queue and whether the service is guaranteed, for each service queue belonging to a same priority level.

* * * * *